US009450690B2

(12) United States Patent
Jones et al.

(10) Patent No.: US 9,450,690 B2
(45) Date of Patent: Sep. 20, 2016

(54) SYSTEMS AND METHODS FOR HIGHLY SCALABLE AUTOMATED TESTING AND MONITORING OF RECEIVING DEVICES

(75) Inventors: Kenneth Jones, Palmer Lake, CO (US); Rodney Davis, Parker, CO (US); Robert Wallen, Centennial, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 204 days.

(21) Appl. No.: 13/095,685

(22) Filed: Apr. 27, 2011

(65) Prior Publication Data

US 2012/0278826 A1 Nov. 1, 2012

(51) Int. Cl.

| | |
|---|---|
| ***H04N 21/442*** | (2011.01) |
| ***H04N 21/443*** | (2011.01) |
| ***H04N 21/431*** | (2011.01) |
| ***H04N 21/44*** | (2011.01) |
| ***H04N 21/41*** | (2011.01) |
| ***H04N 21/422*** | (2011.01) |
| ***H04N 17/00*** | (2006.01) |
| ***H04N 17/02*** | (2006.01) |
| ***H04N 17/04*** | (2006.01) |
| ***H04N 5/765*** | (2006.01) |
| ***H04H 60/32*** | (2008.01) |
| *H04H 20/12* | (2008.01) |

(52) U.S. Cl.

CPC .............. *H04H 60/32* (2013.01); *H04H 20/12* (2013.01)

(58) Field of Classification Search

CPC ................... H04N 21/44231; H04N 21/4424; H04N 21/443; H04N 21/4131; H04N 21/44008; H04N 21/42201; H04N 21/4318; H04N 17/0004; H04N 17/02; H04N 17/04; H04N 17/0045; H04N 5/765

USPC ................ 725/21, 107, 110, 131, 133, 139; 348/180, 181

See application file for complete search history.

(56) References Cited

U.S. PATENT DOCUMENTS

| | | | | |
|---|---|---|---|---|
| 7,050,090 | B2 | 5/2006 | Brodigan | 348/180 |
| 2004/0093370 | A1 | 5/2004 | Blair et al. | 709/200 |
| 2008/0168520 | A1 * | 7/2008 | Vanderhoff et al. | 725/131 |
| 2009/0031373 | A1 * | 1/2009 | Hogyoku | 725/104 |
| 2009/0064251 | A1 | 3/2009 | Savoor et al. | 725/110 |
| 2009/0089854 | A1 * | 4/2009 | Le et al. | 725/139 |
| 2009/0244290 | A1 * | 10/2009 | McKelvey et al. | 348/181 |
| 2009/0249428 | A1 * | 10/2009 | White et al. | 725/133 |
| 2010/0053337 | A1 * | 3/2010 | Kirk et al. | 348/181 |

* cited by examiner

*Primary Examiner* — Benjamin R Bruckart
*Assistant Examiner* — Aklil Tesfaye
(74) *Attorney, Agent, or Firm* — Seed IP Law Group PLLC

(57) ABSTRACT

In various embodiments, a plurality of automated monitoring and control system modules (automated monitoring and control system module) are individually connected to respective receiving devices via the audio and video output ports of each respective receiving device. Each automated monitoring and control system module may be configured to receive a testing program from a centralized monitoring system for the receiving device based on identification data of the receiving device and execute the received testing program for the receiving device. Each automated monitoring and control system module is connected to the centralized monitoring system over a local area network (LAN) or the Internet in order to send testing results, diagnostic data and captured video and audio data for further processing by the centralized monitoring system.

18 Claims, 7 Drawing Sheets

SYSTEMS AND METHODS FOR HIGHLY SCALABLE AUTOMATED TESTING AND MONITORING OF RECEIVING DEVICES

TECHNICAL FIELD

The technical field relates to digital video and audio device testing and more particularly, to apparatus, systems, and methods for providing highly scalable automated testing and monitoring of receiving devices.

BRIEF SUMMARY

In one embodiment, a plurality of automated monitoring and control system modules are individually coupled to respective receiving devices via the audio and video output ports of each respective receiving device. Each automated monitoring and control system module is also connected to a central monitoring system over a local area network (LAN) or the Internet. Each automated monitoring and control system module can send information to the centralized monitoring system regarding the model and configuration information of the receiving device to which it is connected. Then customized testing programs and scripts are automatically downloaded to each automated monitoring and control system module applicable to the particular model of the receiving device to which it is connected.

Each automated monitoring and control system module then executes the customized testing program for the respective receiving device to which it is coupled. To execute each respective customized testing program, each automated monitoring and control system module controls operation of the receiving device to which it is connected via wireless remote control commands sent from the automated monitoring and control system module to the receiving device via a wireless remote control signal. This test may be performed to simulate various commands that an end user of the receiving device would send using the receiver's remote control device. For example, such commands as changing channels, changing the volume, recording, playing, pausing, fast forwarding and rewinding of programs, selecting menu items, configuring the receiving device, and any other command that could be sent from the remote control device of the receiving device may be sent by the automated monitoring and control system module during the test execution. The automated monitoring and control system module may also control the temperature of a testing environment of the receiving device and vary AC voltages to the receiving device.

During or after running each customized testing program (e.g., by the automated monitoring and control system module sending wireless commands to the remote control receiver of the connected receiving device), each automated monitoring and control system module may also send information such as captured or stored video, audio and test results to the central monitoring system for further processing. This enables a large number of receiving devices to be tested concurrently with less manual intervention and also allows more sophisticated remote testing (e.g., while the receiver is at the end user's or customer's premises).

In another embodiment, a method for testing a receiving device is provided. The method may include aspects of the processes described above, as well as others described herein.

A device for testing a receiving device is provided. The device may include components that cause the methods described above, and others described herein, to be performed.

In another embodiment, a system for testing a plurality of receiving devices is provided. The system may include components that cause the methods described above, and others described herein, to be performed.

In another embodiment, a non-transitory computer-readable medium is provided. The non-transitory computer-readable storage medium has computer executable instructions thereon that, when executed by a computer processor, cause the processor to perform the methods described above, as well as others described herein.

BRIEF DESCRIPTION OF THE DRAWINGS

The components in the drawings are not necessarily to scale relative to each other. Like reference numerals designate corresponding parts throughout the several views.

DETAILED DESCRIPTION

A. Environment Overview

Figure 1:
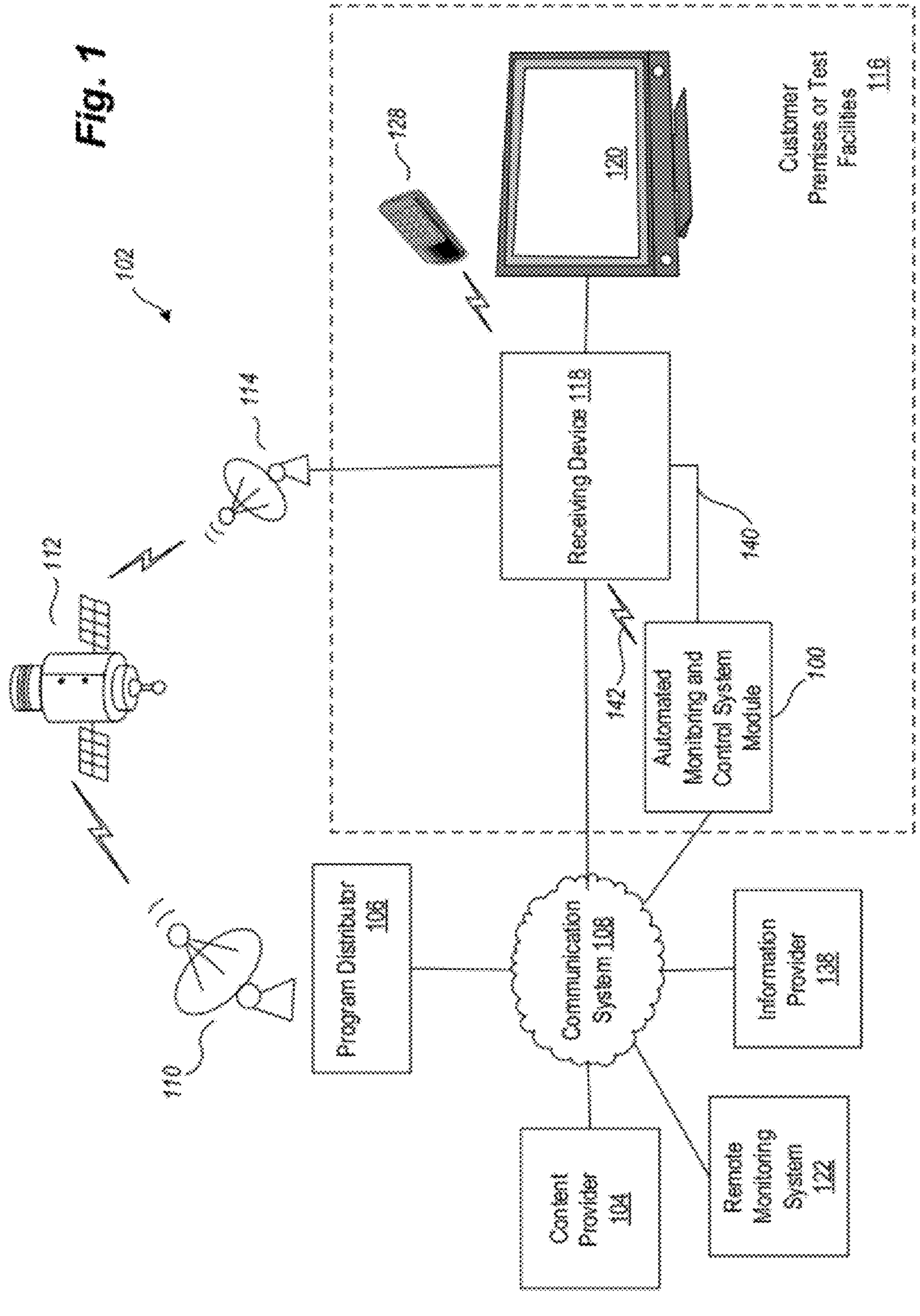
FIG. 1 is a block diagram illustrating an example content distribution environment in which embodiments of highly scalable automated testing and monitoring of receiving devices may be implemented.

FIG. 1 is an overview block diagram illustrating an example content distribution environment 102 in which embodiments of highly scalable automated testing and monitoring of receiving devices may be implemented. An automated monitoring and control system module (automated monitoring and control system module) 100 may be operably connected to a receiving device (e.g., on a customer premises) via various inputs and outputs of the receiving device 118 to control operation and monitor output of the receiving device 118. For example, the various wired inputs and outputs such as audio, video and universal serial bus (USB) inputs and outputs, are represented by line 140, while the wireless commands are sent to the receiving device 118 via a wireless signal represented by signal 142.

The automated monitoring and control system module 100 may also be operably connected to a communications network 108 to send and receive information regarding the testing and monitoring of the receiving device 118 and configuration information regarding the receiving device 118. The automated monitoring and control system module 100 provides for the control of the receiving device 118 and may also provide control of a testing environment. For example, the automated monitoring and control system module may control satellite signal levels input to the receiving device 118, control and vary AC voltages to the receiving device 118, control operation of the receiving device 118 via wireless remote control commands sent from the automated monitoring and control system module to the receiving device 118, control the temperature of a testing environment of the receiving device 118, etc. The automated monitoring and control system module 100 reports performance data of the receiving device 118 over the communication system 108 to a remote monitoring system 122 and may also perform analysis of the performance data and any captured video or audio data from the receiving device 118. The automated monitoring and control system module may also request additional analysis from the monitoring system 122 over the communication system 108. This allows the automated monitoring and control system module 100 to be remotely located from the monitoring system 122. The remote monitoring system 122 may be that of the content provider 104, program distributor 106, information provider 138, receiving device 118 manufacturer (not shown) or other entity or third party.

The remote monitoring system 122 may also be a centralized monitoring system for multiple receiving devices at various remote locations, each receiving device 118 having a corresponding automated monitoring and control system module connected to the communication system 108. The remote monitoring system 122 may also provide further analysis of performance information sent from the automated monitoring and control system module 100 of the receiving device 118 or from other automated monitoring and control system module devices of other remote receiving devices. Before providing additional details regarding the operation and constitution of the automated monitoring and control system module 100, the example content distribution environment 102, within which the automated monitoring and control system module 100 may operate, will briefly be described.

In the content distribution environment 102, audio, video, and/or data service providers, such as, but not limited to, television service providers, provide their customers a multitude of video and/or data programming (hereafter, collectively and/or exclusively "programming"). Such programming is often provided by use of a receiving device communicatively coupled to a presentation device 120 configured to receive the programming.

The receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by a user, the receiving device 118 processes and communicates the selected programming to the presentation device 120.

For convenience, the receiving device 118 may be interchangeably referred to as a "television converter," "receiver," "set-top box," "television receiving device 118," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive or playback programming. Further, the receiving device 118 may itself include user interface devices, such as buttons or switches. In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like. The automated monitoring and control system module 100 may also have such wireless functionality to control the receiving device 118 remotely. In some embodiments, the automated monitoring and control system module 100 could also send commands to the receiving device 118 through a wired medium (e.g., Ethernet) to the receiving device 118.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 employ a display, one or more speakers, and/or other output devices to communicate video and/or audio content to a user. In many implementations, one or more presentation devices 120 reside in or near a customer's premises or test facilities 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality. Also, the presentation device 120 may be connected directly to a video output of the automated monitoring and control system module 100 instead of or in addition to being connected to the video output of the receiving device 118.

A content provider 104 provides program content, such as television content, to a distributor, such as the program distributor 106. Example content providers include television stations which provide local or national television programming, special content providers which provide premium based programming or pay-per-view programming.

Program content, interchangeably referred to as a program, is communicated to the program distributor 106 from the content provider 104 through suitable communication media, generally illustrated as communication system 108 for convenience. Communication system 108 may include many different types of communication media, now known or later developed. Non-limiting media examples include telephone systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems.

In at least one embodiment, the received program content is converted by the program distributor 106 into a suitable signal (a "program signal") that is communicated (i.e., "uplinked") by one or more antennae 110 to one or more satellites 112 (separately illustrated herein from, although considered part of, the communication system 108). The communicated uplink signal may contain a plurality of multiplexed programs. The uplink signal is received by the satellite 112 and then communicated (i.e., "downlinked") from the satellite 112 in one or more directions, for example, onto a predefined portion of the planet.

A receiver antenna 114 that is within reception range of the downlink signal communicated from satellite 112 receives the above-described downlink signal. A wide variety of receiver antennae 114 are available. Some types of receiver antenna 114 are operable to receive signals from a single satellite 112. Other types of receiver antenna 114 are operable to receive signals from multiple satellites 112 and/or from terrestrial based transmitters. In some embodiments, antenna 114 is a terrestrial "over-the-air" ("OTA") broadcast antenna that is configured to receive a program signal from a terrestrial based transmitter, such as broadcast transmit tower. Furthermore, in some cases, the receiving device 118 is operable to receive signals from multiple, distinct antennas.

The receiver antenna 114 can be located at customer premises or test facilities 116. Examples of customer premises include a residence, a business, or any other suitable location operable to receive signals from satellite 112. Examples of test facilities include any location at which the receiving device 118 is tested other than at the customer premises. The received signal is communicated, typically over a hard-wire connection, to a receiving device. The receiving device 118 converts the received signal from antenna 114 into a signal and/or format suitable for communication to a presentation device 120 or another device, such as another digital video recorder or a home computing system. In some embodiments, the receiver antenna 114 may be remotely located from the customer premises or test facilities 116. For example, the antenna 114 may be located on the roof of an apartment building, such that the received signals may be transmitted, after possible recoding, via cable or other mechanisms, such as Wi-Fi, to the customer premises or test facilities 116.

The receiving device 118 may receive programming partially, or entirely, from a source other than the above-described receiver antenna 114. Other embodiments of the receiving device 118 may receive programming from program distributors 106 and/or content providers 104 via locally broadcast RF signals, cable, fiber optic, Internet media, or the like.

In addition, information provider 138 may provide various forms of content and/or services to various devices residing in the customer premises or test facilities 116. For example, information provider 138 may provide a Web page (or other information) to the receiving device 118 or other computing device. Information provider 138 may further perform or facilitate electronic commerce transactions. Information provider 138 may also provide information regarding testing or configuration of the receiving device 118 in addition to, or instead of, such information being provided by the remote monitoring system 122.

In the illustrated example, the automated monitoring and control system module 100 may monitor the receiving device 118 as it receives and processes the received program content. The automated monitoring and control system module 100 may also control the receiving device 118 by sending commands to the receiving device 118 to switch between, tune to and/or display particular received program content by sending corresponding commands to the automated monitoring and control system module 100 (e.g., by using the suitable wireless medium, such as IR, RF, or the like). In some embodiments, the automated monitoring and control system module 100 could also send commands to the receiving device 118 through a wired medium (e.g., Ethernet) to the receiving device 118. The automated monitoring and control system module 100 may also control the receiving device 118 by sending commands to the receiving device 118 to perform particular e-commerce transactions or perform other interactive operations, such as, for example, any commands that could be entered by a user via a remote control device or other interface. The automated monitoring and control system module 100 is configured to communicate testing and monitoring results of the receiving device 118 over the communication system 108 to remote entities, such as, for example, remote monitoring system 122 for further action, processing or reporting.

The above description of the content distribution environment 102, the customer premises or test facilities 116, and the various devices therein, is intended as a broad, non-limiting overview of an example environment in which various embodiments of a highly scalable automated testing and monitoring of receiving devices may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein.

Example embodiments described herein provide applications, tools, data structures and other support to implement highly scalable automated testing and monitoring of receiving devices. Other embodiments of the described techniques may be used for other purposes, including monitoring and testing of other receiving devices, such as audio and DVD players, digital recorders, computers, peripherals, televisions, mobile devices, telephones, and other electronic devices. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

B. Example Receiving Device Overview

Figure 2:
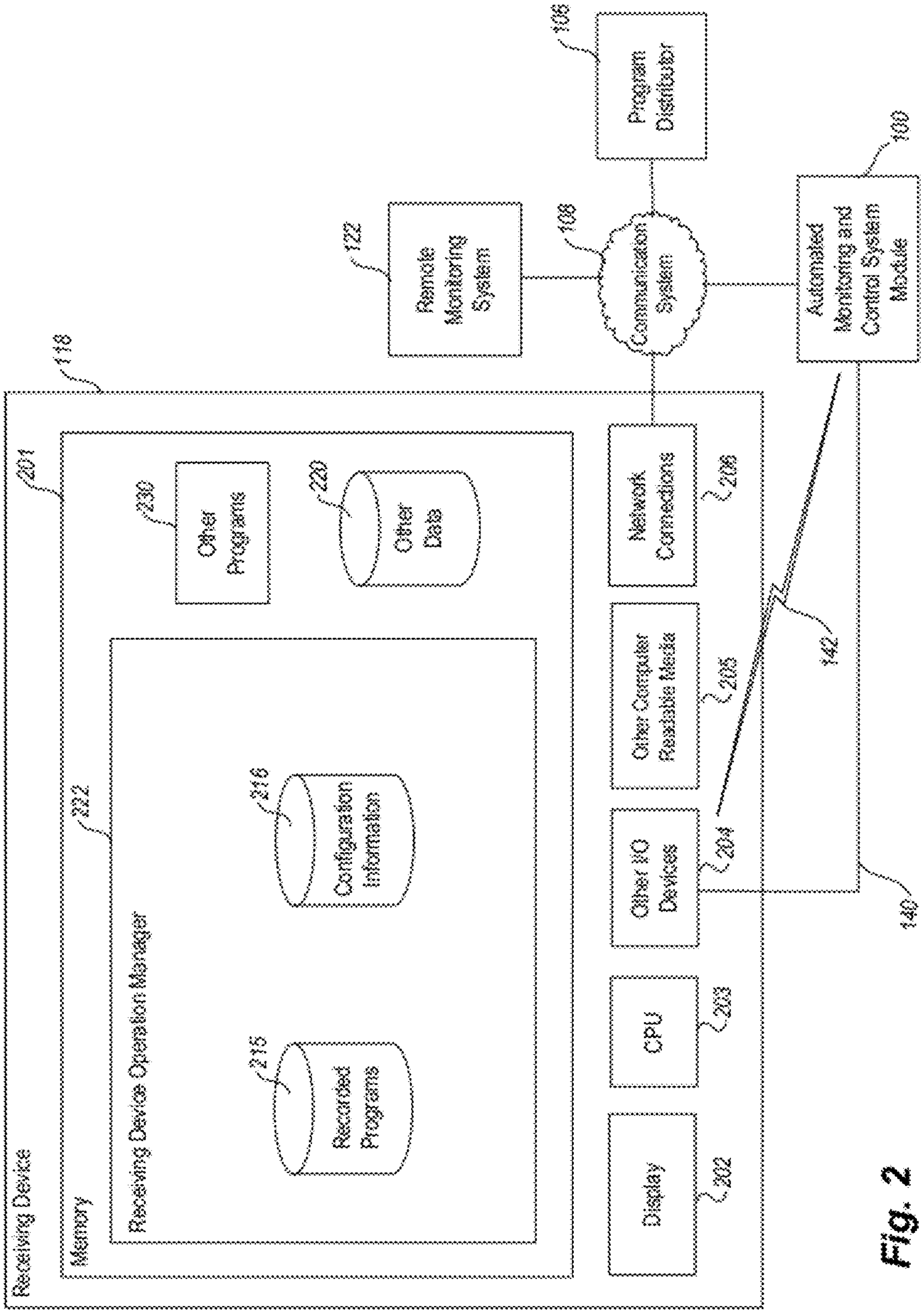
FIG. 2 is a block diagram illustrating elements of an example receiving device within a system for highly scalable automated testing and monitoring of receiving devices according to one embodiment.

FIG. 2 is a block diagram illustrating elements of a receiving device within a system for highly scalable automated testing and monitoring of receiving devices according to one example embodiment.

FIG. 2 shows particular components of the receiving device 118 that may be utilized to operate and store information regarding the receiving device 118. In one embodiment, the receiving device 118 a set-top box configured to receive, record and display programming on a presentation device. In other embodiments, the receiving device 118 is a presentation device, such as a television or is a digital video recorder (DVR) device.

Note that one or more general purpose or special purpose computing systems/devices may be used to operate, store information regarding the receiving device 118, and communicate with the automated monitoring and control system module 100. In addition, the receiving device 118 may comprise one or more distinct computing systems/devices and may span distributed locations. Furthermore, each block shown may represent one or more such blocks as appropriate to a specific embodiment or may be combined with other blocks. Also, the receiving device 118 operation manager 222 may be implemented in software, hardware, firmware, or in some combination to achieve the capabilities described herein.

In the embodiment shown, receiving device 118 comprises a computer memory ("memory") 201, a display 202, one or more Central Processing Units ("CPU") 203, Input/Output devices 204 (e.g., keyboard, mouse, RF or infrared receiver, light emitting diode (LED) panel, cathode ray tube (CRT) or liquid crystal display (LCD), USB ports, other communication ports, and the like), other computer-readable media 205, and network connections 206. The receiving device 118 operation manager 222 is shown residing in memory 201. In other embodiments, some portion of the contents, some, or all, of the components of the receiving device 118 operation manager 222 may be stored on and/or transmitted over the other computer-readable media 205. The components of the receiving device 118 operation manager 222 preferably execute on one or more CPUs 203 and facilitate the receiving, decoding, processing, selecting, recording, playback and displaying of programming, as described herein. The receiving device 118 operation manager 222 also facilitates communication with peripheral devices, (e.g., the automated monitoring and control system module 100) via the I/O devices 204 and network connections 206.

Recorded programming may reside on the recording data repository 215 and various configuration information of the receiving device 118 may reside on the configuration information data repository 216. The configuration information may be communicated via the network connections 206 through the communication system 108 to the automated monitoring and control system module 100 to facilitate testing and monitoring by the automated monitoring and control system module or may be displayed on the display 202, the output device 204, or other display, and captured by a camera of the automated monitoring and control system module 100. The receiving device 118 operation manager 222 may also interact via the communication system 108 with other devices and systems such as the program distributor 106, remote monitoring system 122, or the like. For example, the other device may be a home computing system (e.g., a desktop computer, a laptop computer, etc.) that includes the functionality of the automated monitoring and control system module 100.

Other code or programs 230 (e.g., an audio/video processing module, a program guide manager module, a Web server, and the like), and potentially other data repositories, such as data repository 220, also reside in the memory 201, and preferably execute on one or more CPUs 203. Of note, one or more of the components in FIG. 2 may not be present in any specific implementation. For example, some embodiments may not provide other computer readable media 205 or a display 202.

In some embodiments, the receiving device 118 operation manager 222 includes an application program interface ("API") that provides programmatic access to one or more functions of the receiving device 118 operation manager 100. For example, such an API may provide a programmatic interface to one or more functions of the receiving device 118 operation manager 100 that may be invoked by one of the other programs 230, the automated monitoring and control system module 100, or some other module. In this manner, the API may facilitate the development of third-party software, such as user interfaces, plug-ins, adapters (e.g., for integrating functions of the receiving device 118 operation manager 222 and automated monitoring and control system module 100 into desktop applications), and the like.

In addition, the API may be, in at least some embodiments, invoked or otherwise accessed via the automated monitoring and control system module 100, or remote entities, such as the program distributor 106 and the remote monitoring system 122, to access various functions of the receiving device 118 operation manager 222. For example, a user operating the automated monitoring and control system module 100 may select particular video or audio signals to be output at the various I/O devices 204, perform particular configurations of the receiving device 118, or perform various recording and playback operations by the receiving device 118 operation manager 222 via the API.

In an example embodiment, components/modules of the receiving device 118 operation manager 222 are implemented using standard programming techniques. For example, the receiving device 118 operation manager 222 may be implemented as a "native" executable running on the CPU 203, along with one or more static or dynamic libraries. In other embodiments, the receiving device 118 operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the receiving device operation manager 222. In one embodiment, instructions cause the CPU 203 or some other processor, such as an I/O controller/processor, to select and present various programming. Similarly, the CPU 203 or other processor may be configured to perform other operations such as playing a recording in various playback modes.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a receiving device operation manager implementation. Also, other functions could be implemented and/or performed by each component/module, and in different orders, and by different components/modules, yet still achieve the functions of the receiving device 118 operation manager 222.

In addition, programming interfaces to the data stored as part of the receiving device 118 operation manager 222, can be available by standard mechanisms such as through C, C++, C#, and Java APIs; libraries for accessing files, databases, or other data repositories; scripting languages such as XML; or Web servers, FTP servers, or other types of servers providing access to stored data. The recording data repository 215 and configuration information repository 216 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device 118 operation manager 222.

Furthermore, in some embodiments, some or all of the components of the receiving device 118 operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

C. Example Connections Between Receiving device and Automated Monitoring and Control System Module FIG. 3 is a block diagram illustrating connections between a receiving device and an automated monitoring and control system module (automated monitoring and control system module) 100 within a system for highly scalable automated testing and monitoring of receiving devices according to one example embodiment.

Shown is an example automated monitoring and control system module 100 operably connected to an example receiving device 118. Also operably connected to the automated monitoring and control system module 100 is a display 335. Note that the display 335 is different than the display 120 connected to the receiving device 118 as shown in FIG. 1 in the illustrated embodiment. However, in other embodiments, display 335 connected to the automated monitoring and control system module 100 may be the same as the display 120 connected to the receiving device 118. The display 335 may be connected to the automated monitoring and control system module and receive a digital or analog video output signal 334 from the automated monitoring and control system module 100 or may be integrated with the automated monitoring and control system module 100.

The receiving device 118 includes various video and audio outputs coupled to corresponding inputs of the automated monitoring and control system module 100. These include two composite video outputs (TV1 301 and TV2 302), a coaxial cable analog television signal output (Analog TV COAX 303), Separate Video (S-Video) output (TV1 S-Video 304), two audio outputs (TV1 Audio 305 and TV2 Audio 306), a digital audio output (TV1 Digital Audio 307) a High-Definition Multimedia Interface (HDMI) output (TV1 HDMI 308), and a component video output (TV1 Component 309). The above video and audio outputs are coupled to corresponding inputs of the automated monitoring and control system module 100. These corresponding inputs include two composite video inputs 311 and 312, a coaxial cable analog television signal input 313, an S-Video input 314, two audio inputs 315 316, a digital audio input 317, an HDMI input 318, and a video component input 319.

Figure 3:
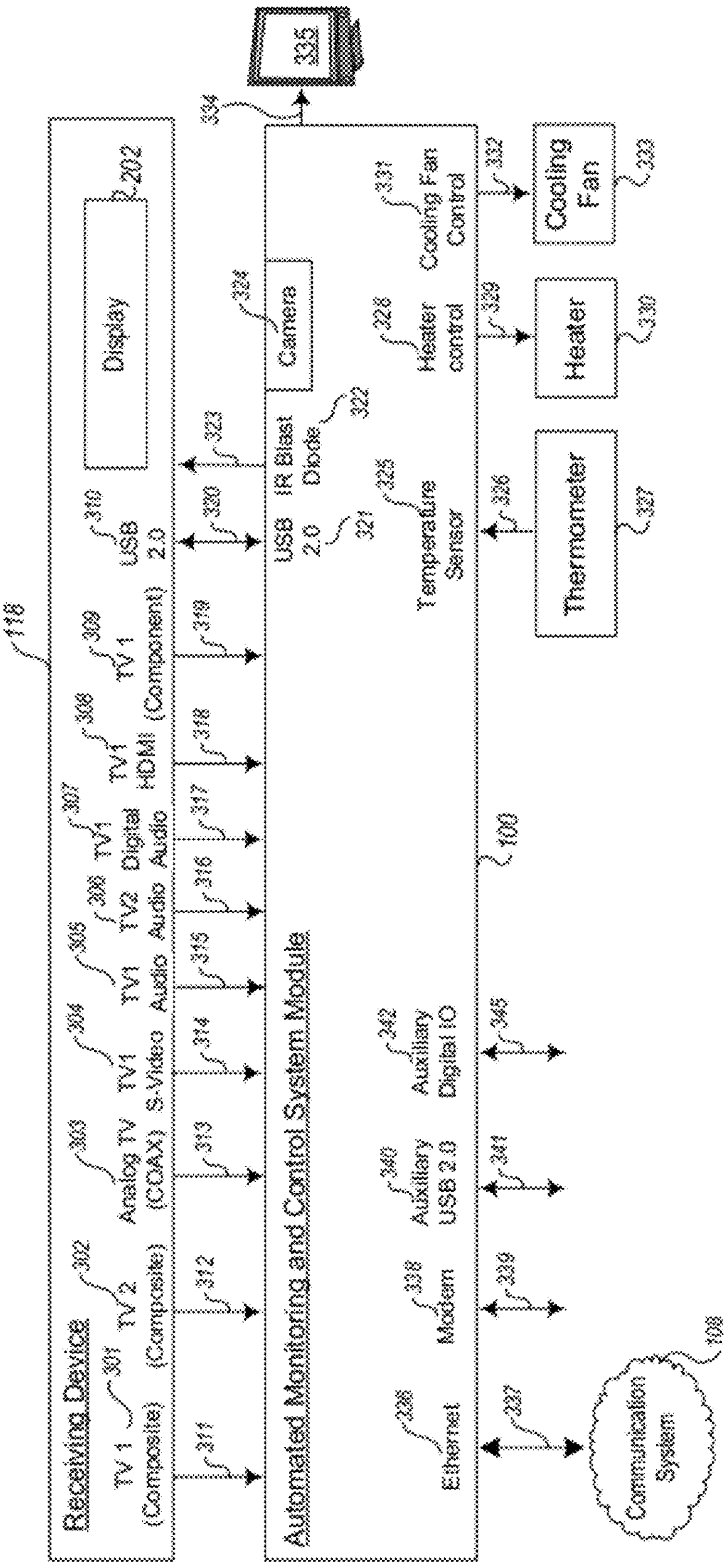
FIG. 3 is a block diagram illustrating connections between a receiving device and an automated monitoring and control system module (automated monitoring and control system module) within a system for highly scalable automated testing and monitoring of receiving devices according to one example embodiment.

Although particular types and a particular number of audio and video outputs are depicted in the present example shown in FIG. 3, various other types, configurations and numbers of audio and video outputs may also be included on the receiver 118, and thus corresponding inputs may be included in the automated monitoring and control system module 100. For example, any one of the types of audio and video or audio outputs may be for a wireless connection and there may be more or less of any type of audio or video output included in the receiving device 118. Various other digital output types corresponding to any number of video, audio or networking interface signal and/or connector standards may be provided in the receiving device 118 including any corresponding inputs included in the automated monitoring and control system module 100. These may include, but are not limited to: Digital Visual Interface (DVI), Gigabit Video Interface (GVIF), Unified Display Interface (UDI), Video Graphics Array (VGA), Super Video Graphics Array (SVGA), Radio and Television Receiver Manufacturers' Association (SCART) interfaces, Bayonet Neill-Concelman (BNC) outputs, Multimedia over Coax (MoCa), Ethernet, etc. The automated monitoring and control system module 100 also includes a USB 2.0 module 310 to send and receive information to and from a corresponding USB 2.0 module 321 of the automated monitoring and control system module 100 via a wired or wireless USB 2.0 signal 320. Information such as device configuration information, video and audio data, and test data or test commands may also or instead be communicated via the USB 2.0 signal 320 between the receiving device 118 and the automated monitoring and control system module 100.

The automated monitoring and control system module 100 also includes an infrared (IR) and/or a radio frequency (RF) wireless control (IR Blast Diode 322) operable and configured to control the receiving device 118 via an IR wireless signal 323 in the same manner or a manner similar to a corresponding remote control device 128 (shown in FIG. 1) of the receiving device 118. Thus, the automated monitoring and control system module may send commands or a set of commands to control operation of the receiving device 118 to simulate any of various commands that may otherwise be sent manually using the remote control device 128.

For example, such commands as changing channels, changing the volume, recording, playing, pausing, fast forwarding and rewinding of programs, selecting menu items, configuring the receiving device 118, navigating the channel guide, and any other command that could be sent from the remote control device of the receiving device 118 may be sent by the automated monitoring and control system module 100 during the test execution. The automated monitoring and control system module 100 may also control the temperature of a testing environment of the receiving device 118 and vary AC voltages to the receiving device 118.

The automated monitoring and control system module 100 also includes a camera 324 that is configured to take a digital image of the display 202 of the receiving device 118. For example, the display of the receiving device 118 may include a panel of various light emitting diodes (LEDs) to indicate various current operating states, conditions, messages or functionalities of the receiving device 118. The image of the display 202 may then be analyzed by the automated monitoring and control system module 100 to determine current operating states, conditions, messages or functionalities of the receiving device 118. The automated monitoring and control system module 100 may then perform various functions or send various commands to the automated monitoring and control system module (e.g., via the IR blast diode 322) accordingly to the receiving device 118 to run applicable tests, perform particular analyses, send particular information to the remote monitoring system, etc., depending on the determined current operating state, condition, message or functionality of the receiving device 118.

The automated monitoring and control system module 100 also includes a heater control 328 and a cooling fan control 331 to control a corresponding external heater 330 and external cooling fan 333, respectively, via heater control output signal 329 and cooling fan control output signal 332 to vary the temperature of a testing environment (e.g., a testing chamber) in which the receiving device 118 may be placed. The automated monitoring and control system module 100 also includes a temperature sensor 325 to receive a temperature signal or temperature data from an external thermometer 327, via thermometer output signal 326 of the testing environment to control a thermostat or other device to control the heater control 328 and cooling fan control 331 accordingly.

The automated monitoring and control system module 100 also includes a network module such as an Ethernet transceiver 336 that operably connects the automated monitoring and control system module 100 to the communication system 108 via a wired or wireless network signal 337. The automated monitoring and control system module 100 may send data and information gathered under various testing scenarios via the various connections between the receiving device 118 and the automated monitoring and control system module 100 regarding operations and performance of the receiving device 118. For example, this data and information regarding operations and performance of the receiving device 118 may be sent to one or more remote monitoring systems (shown in FIGS. 1 and 5) over the communication system 108. Also, data may be received via the network signal 337 from the communication system 108 regarding the particular receiving device and particular tests to be run on the receiving device 118 according to information regarding the receiving device 118 previously sent to or otherwise received by the remote monitoring system. Various other types of network or communication system connections, modems, cards, receivers, or transceivers, etc. may also or instead be included in the automated monitoring and control system module 100 that are configured to communicate with remote systems over various corresponding types of networks.

Also shown is a modem 338 of the automated monitoring and control system module 100 that is operable to send and receive data via communications signal 339 over various communications or telephone systems, including, in some instances, communication system 108. The automated monitoring and control system module 100 also includes an auxiliary USB 2.0 module 340 operable to receive and send data via respective USB 2.0 signal 341 and an auxiliary digital 10 module 342, each operable to receive and send data via respective digital signal 345. The automated monitoring and control system module 100 may also have other auxiliary port types and configurations in other embodiments as applicable or needed for a particular testing environment, testing scenario or to test a particular receiving device.

D. Example Automated Monitoring and Control System Module

Figure 4:
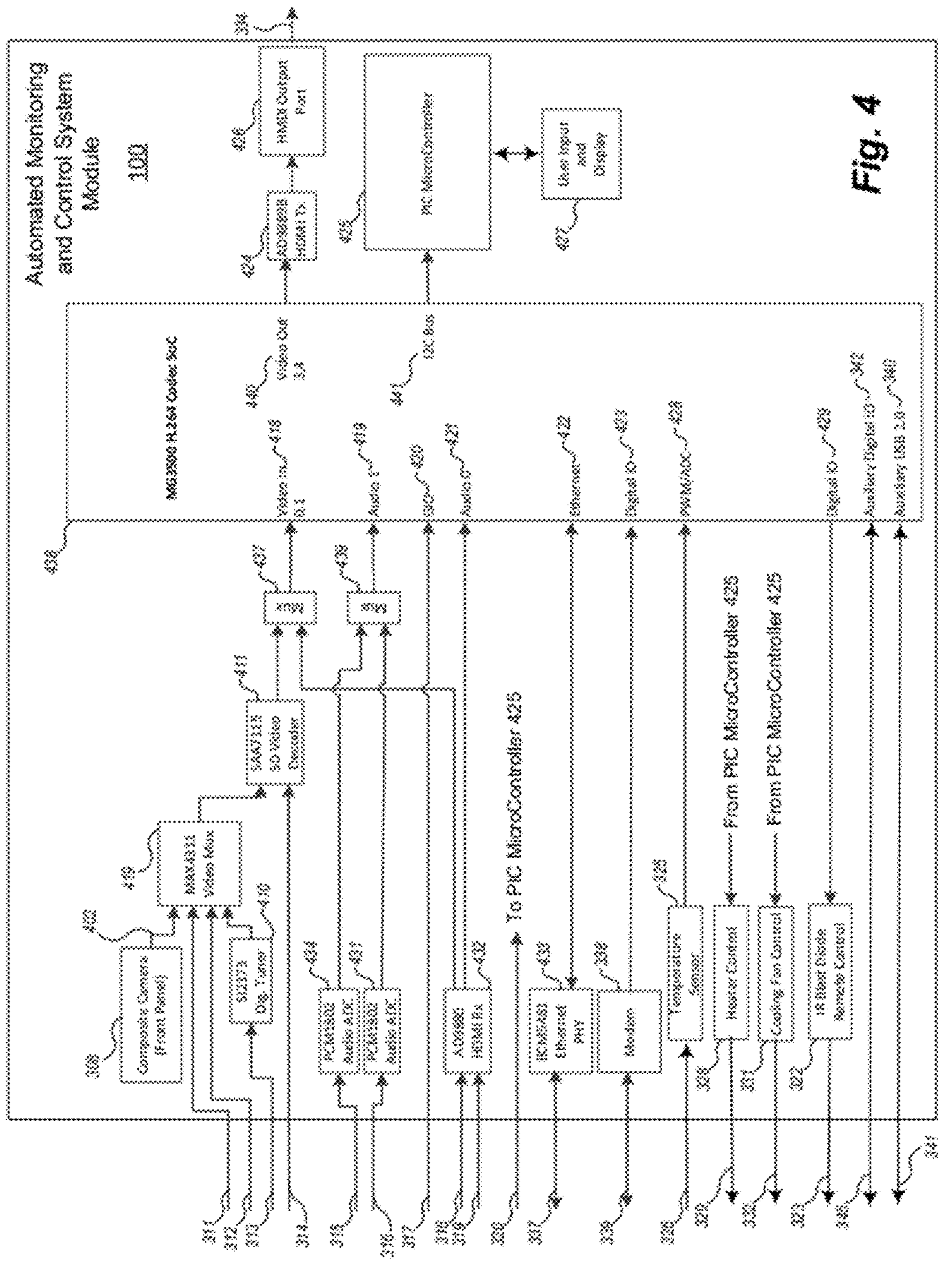
FIG. 4 is a schematic of the automated monitoring and control system module of FIG. 3 according to one example embodiment.

FIG. 4 is schematic of the automated monitoring and control system module 100 of FIG. 3 according to one example embodiment. Shown are various inputs as shown in FIG. 3 to various components to the automated monitoring and control system module 100 that are from the corresponding outputs of the receiving device 118.

The automated monitoring and control system module 100 includes a coder-decoder (codec) 438 to process the various signals provided as inputs from the corresponding outputs of the receiving device 118 (e.g., receiving device 118), the output of which is operably connected a microcontroller 425 to control performance of the various functions and communications of the automated monitoring and control system module 100 including user interface input and output, heater and fan environmental controls, and temperature sensor monitoring as described herein based on the received inputs from the receiving device 118 and testing environment. Also, the codec 438 includes an internal Advanced RISC Machines (ARM) processor (not shown), which is a 32-bit reduced instruction set (RISC) processor that performs the test programs and video and audio analysis and transfer. The microcontroller 425 of the automated monitoring and control system module 100 may be a PIC® microcontroller available from Microchip Technology Inc., with headquarters in Chandler, Ariz., USA. However, other suitable microcontrollers or combinations or microcontrollers and processors for controlling performance of the various functions, monitoring, testing and communications of the automated monitoring and control system module 100 as described herein based on the received inputs from the receiving device 118 (or other device under test) and testing environment may be utilized. The codec 438 may be a Mobilygen MG3500 HD H.264 codec SoC available from Maxim Integrated Products, Inc., headquartered in Sunnyvale, Calif., USA. However, other suitable codecs for processing of the video and audio data from the receiver 118 may also be utilized. The USB 2.0 signal 341 is also operably provided to the auxiliary USB 2.0 module 340 of the codec 438.

The input 402 providing image data from the composite camera (the camera 308 of FIG. 3), the composite input 311, and the composite input 312 are input to a video multiplexer 419. For example, the video multiplexer 419 may be a MAX4310 multiplexer-amplifier available from Maxim Integrated Products, Inc. However, other suitable video multiplexers for multiplexing the video from the receiving device 118 may also be utilized. Also, the analog TV (COAX) input 313 is input to a digital tuner 410, the output of which is also an input to the video multiplexer 419. For example, the digital tuner may be an SI2173 digital tuner available from Silicon Laboratories, Inc., with headquarters in Austin, Tex., USA. However, other suitable tuners for processing of the analog TV (COAX) input 313 may also be utilized.

The S-Video input 314 is provided as input to a decoder 411 of the automated monitoring and control system module 100. Also provided as input to the decoder 411 is the output from the video multiplexer 419. For example, the decoder 411 may be an SAA7115 SD Video Decoder available from NXP Semiconductors, with headquarters in Eindhoven, The Netherlands. However, other suitable decoders for decoding of the signal of the TV1 S-Video input 314 and the output from the video multiplexer 419 may be utilized.

The HDMI input 318 and component input 319 are provided as input to an analog/HDMI dual display interface 432. For example, the analog/HDMI dual display interface 432 may be an AD9880 analog/HDMI dual display interface available from Analog Devices, Inc. with headquarters in Norwood, Mass., USA. However, other suitable analog/HDMI interfaces for processing of the HDMI input 318 and component input 319 may also be utilized. The audio output from the analog/HDMI dual display interface 432 is operably connected to the Audio 0 input 421 of the codec 438. The video output from the analog/HDMI dual display interface 432 is operably connected to a multiplexer 437 along with the video output from the decoder 411. The output from the multiplexer 437 is operably connected to the Video input 418 of the codec 438.

The audio input 315 and the audio input 316 are each provided as inputs, respectively to separate audio analog to digital converters 434 and 431. For example, the analog to digital converters 434 and 431 may be PCM1802 audio digital to analog converters available from Texas Instruments, Inc, with headquarters in Dallas, Tex., USA. However, other suitable analog to digital converters for converting the audio signals from the audio input 315 and the audio input 316 may be utilized. The outputs of the analog to digital converters 434 and 431 are operably connected to inputs of a multiplexer 439, the output of which is operably connected to the Audio 1 input 419 of the codec 438. Also, the digital audio input 317 from the corresponding receiving device TV1 digital audio output 307 is operably connected to the general purpose input/output (GPIO or GIO) input 420 of the codec 438.

The USB 2.0 signal 320 from the corresponding receiving device USB 2.0 module 310 is operably provided to the microcontroller 425 of the automated monitoring and control system module 100.

The network signal 337 from the Ethernet transceiver 336 of the receiving device 118 (or other network connection such as from communication system 108) is operably provided to the Ethernet transceiver 433, the output of which is operably provided to the Ethernet input 422 of the codec 438. The Ethernet transceiver 433, for example, may be a BCM5481 10BASE-T/100BASE-TX/1000BASE-T Gigabit Ethernet transceiver, available from Broadcom Corporation, with headquarters in Irvine, Calif., USA. However, other types of Ethernet transceivers to enable uplink and general Gigabit Ethernet connectivity applications or for otherwise sending and receiving network traffic, or other types of network transceivers, may be utilized to communicate with the receiving device 118, communication system 108, or other device under test. In addition, the communications signal 339 (corresponding to the output of modem 338 of the receiving device 118) is operably provided to a Digital input/output (IO) 423 of the codec 438 to receive and send further information regarding the state or operations of the receiving device 118.

The thermometer output signal 326 in provided as input to the temperature sensor 325. The output of the temperature sensor 325 is operably connected to a pulse width modulation/analog to digital converter (PWM/ADC) 428 of the codec 438 to provide signal processing between the temperature sensor 325 and the microcontroller 425. The heater control module 328 cooling fan control module 331 receive control signals from the microcontroller 425 based on the input from the temperature sensor 325. Also, a digital input/output (IO) 429 of the codec 438 is operably connected to the input of the IR blast diode remote control signal generator 322 to generate the IR wireless signal 323 to send infrared remote control commands to the receiving device 118 or other device under test. However, other types of remote control signal generators (e.g., RF remote control signal generators) may also or instead be utilized to control applicable receiving devices. Also included is the auxiliary digital 10 module 342 to which is provided a digital signal 345.

The Video input 418, the Audio 1 input 419, the GIO 420, the Audio 0 input 421, the Ethernet input 422, the Digital IO 423, the PWM/ADC 428, the Digital IO 429, the auxiliary digital IO 342, the auxiliary USB 2.0 module 340, the Video output 440 and microcontroller 425 are all operably connected to each other via a system bus 441. The system bus 441, for example, may be an Inter-Integrated Circuit ($I^2C$) bus, which enables communication between components residing on the same circuit board, and is available from NXP Semiconductors. However, other system buses that enable communication between various components of the automated monitoring and control system module 100 may also be utilized.

The Video output 440 is operably connected to an input of an HDMI transmitter 424 and is operably connected to an HDMI output port 426 from which the which the video output signal 334 is output, or is alternatively input directly to an integrated digital video display. The HDMI transmitter, for example, may be an AD9889B HDMI/DVI transmitter available from Analog Devices, Inc. However, other digital video transmitters suitable for transmitting the HDMI or other digital video signals to be output from the automated monitoring and control system module 100 may be utilized.

The microcontroller 425 is operably connected to and in operable two-way communication with one or more user input devices and/or output displays 427 (e.g., a touch-screen, keypad, LED display, liquid crystal display (LCD), other alphanumeric output display, or any combination thereof) enabling a user to enter input to the automated monitoring and control system module 100 to control operation of the automated monitoring and control system module 100, display test results, error messages, diagnostic information, etc., of the receiving device 118, other device under test, the automated monitoring and control system module 100 itself, or any combination thereof. The one or more input devices and/or output displays 427 may be integrated with the automated monitoring and control system module 100 or alternatively connected to the automated monitoring and control system module 100 as one or more external peripheral devices.

The microcontroller 425 of the automated monitoring and control system module may monitor the various video audio and inputs, switching to each different input as needed in a predefined pattern, switching matrix, or in a round-robin fashion, for example. The microcontroller 425 may save particular images, image sequences, or audio to memory of the microcontroller 425, to determine whether various error conditions are present. Such error conditions may include data received indicating a stuck or frozen screen of display 120, lost power, hardware malfunction, lost signal, distorted signal, noise detection, etc. The microcontroller 425 may also detect and store the testing environment conditions (e.g., temperature) during failure conditions and also duplicate such conditions to reproduce the failure on the same receiving device 118 or other devices under test. Test results and testing instructions, programs or scripts may also be communicated over the communication system 108 (shown in FIG. 1 through FIG. 3) via the Ethernet transceiver 433.

Automated monitoring and control system module control software may reside in memory of the microcontroller 425. In other embodiments, some or all of the components of the automated monitoring and control system module control software may be stored on and/or transmitted over the other computer-readable media. The components of the automated monitoring and control system module control software execute on the microcontroller 425 and facilitate the operation of the automated monitoring and control system module, to test and monitor the connected receiving device 118, display and communicate test results, error messages, diagnostic information, etc., of the receiving device 118, other device under test, the automated monitoring and control system module 100 itself, or any combination thereof, as described herein. The automated monitoring and control system module control software also facilitates communication with any peripheral devices and network connections 422 and 423.

Other code or programs (e.g., an audio/video processing module, a program guide manager module, a Web server, and the like) and may also reside in the memory of the microcontroller 425, and execute on the microcontroller 425. Of note, one or more of the components in FIG. 4 may not be present in any specific implementation. For example, some embodiments may not provide a heater/cooling temperature sensor 325 or a display 427.

In some embodiments, the automated monitoring and control system module control software includes an application program interface ("API") that provides programmatic access to one or more functions of the automated monitoring and control system module 100. For example, such an API may provide a programmatic interface to one or more functions of the automated monitoring and control system module 100 that may be invoked by one of the other programs, an external central monitoring system, or some other module. In this manner, the API may facilitate the development of third-party software, such as user interfaces, plug-ins, adapters (e.g., for integrating functions of the automated monitoring and control system module control software and automated monitoring and control system module 100 into desktop applications), and the like.

In addition, the API may be in at least some embodiments invoked or otherwise accessed via other remote entities, such as the program distributor 106 and the remote monitoring system 122 shown in FIG. 1, to access various functions of the automated monitoring and control system module 100. For example, a user operating the automated monitoring and control system module 100 may select particular video or audio signals input from the connected receiving device 118 or other device under test to be monitored at a particular time, perform particular configurations of the automated monitoring and control system module 100, and perform various test, diagnostic and monitoring operations by the automated monitoring and control system module control software via the API.

In an example embodiment, components/modules of the automated monitoring and control system module control software are implemented using standard programming techniques. For example, the automated monitoring and control system module control software may be implemented as a "native" executable running on the microcontroller 425, along with one or more static or dynamic libraries. In other embodiments, the automated monitoring and control system module control software may be implemented as instructions processed by a virtual machine that executes as one or more other programs. In general, a range of programming languages known in the art may be employed for implementing such example embodiments, including representative implementations of various programming language paradigms, including but not limited to, machine languages, object-oriented languages (e.g., Java, C++, C#, Visual Basic.NET, Smalltalk, and the like), functional languages (e.g., ML, Lisp, Scheme, and the like), procedural languages (e.g., C, Pascal, Ada, Modula, and the like), scripting (e.g., Perl, Ruby, Python, JavaScript, VBScript, and the like), and declarative languages (e.g., SQL, Prolog, and the like).

In a software or firmware implementation, instructions stored in a memory configure, when executed, one or more processors of the microcontroller 425 to perform the functions of the automated monitoring and control system module control software. In one embodiment, instructions cause a processor of the microcontroller 425, or some other processor, such as an I/O controller/processor, to select and perform various testing, monitoring, communications, analysis or other operations.

The embodiments described above of the automated monitoring and control system module 100 may also use well-known or other synchronous or asynchronous computing techniques. For example, the various components may be implemented using various programming techniques, for example, such as an executable running on a single processor, or alternatively decomposed using a variety of structuring techniques known in the art, including but not limited to, multiprogramming and multithreading, etc. Also, other functions could be implemented and/or performed by each component/module, and in different orders, and by different components/modules, yet still achieve the functions of the automated monitoring and control system module 100.

In addition, programming interfaces to the data stored as part of the automated monitoring and control system module control software can be available by standard mechanisms such as through C, C++, C#, and Java APIs; libraries for accessing files, databases, or other data repositories; through scripting languages such as XML; or through Web servers, FTP servers, or other types of servers providing access to stored data.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Also, other functionality could be provided by each component/module, or existing functionality could be distributed amongst the components/modules in different ways, yet still achieve the functions of the automated monitoring and control system module 100.

Furthermore, in some embodiments, some or all of the components of the automated monitoring and control system module control software may be implemented or provided in other manners, such as at least partially in firmware and/or hardware, including, but not limited to, one or more application-specific integrated circuits ("ASICs"), standard integrated circuits, controllers (e.g., by executing appropriate instructions, and including other microcontrollers and/or embedded controllers), field-programmable gate arrays ("FPGAs"), complex programmable logic devices ("CPLDs"), and the like. Some or all of the system components of the automated monitoring and control system module 100 and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components of the automated monitoring and control system module 100 and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the automated monitoring and control system module 100 may be practiced with other system configurations.

Figure 5:
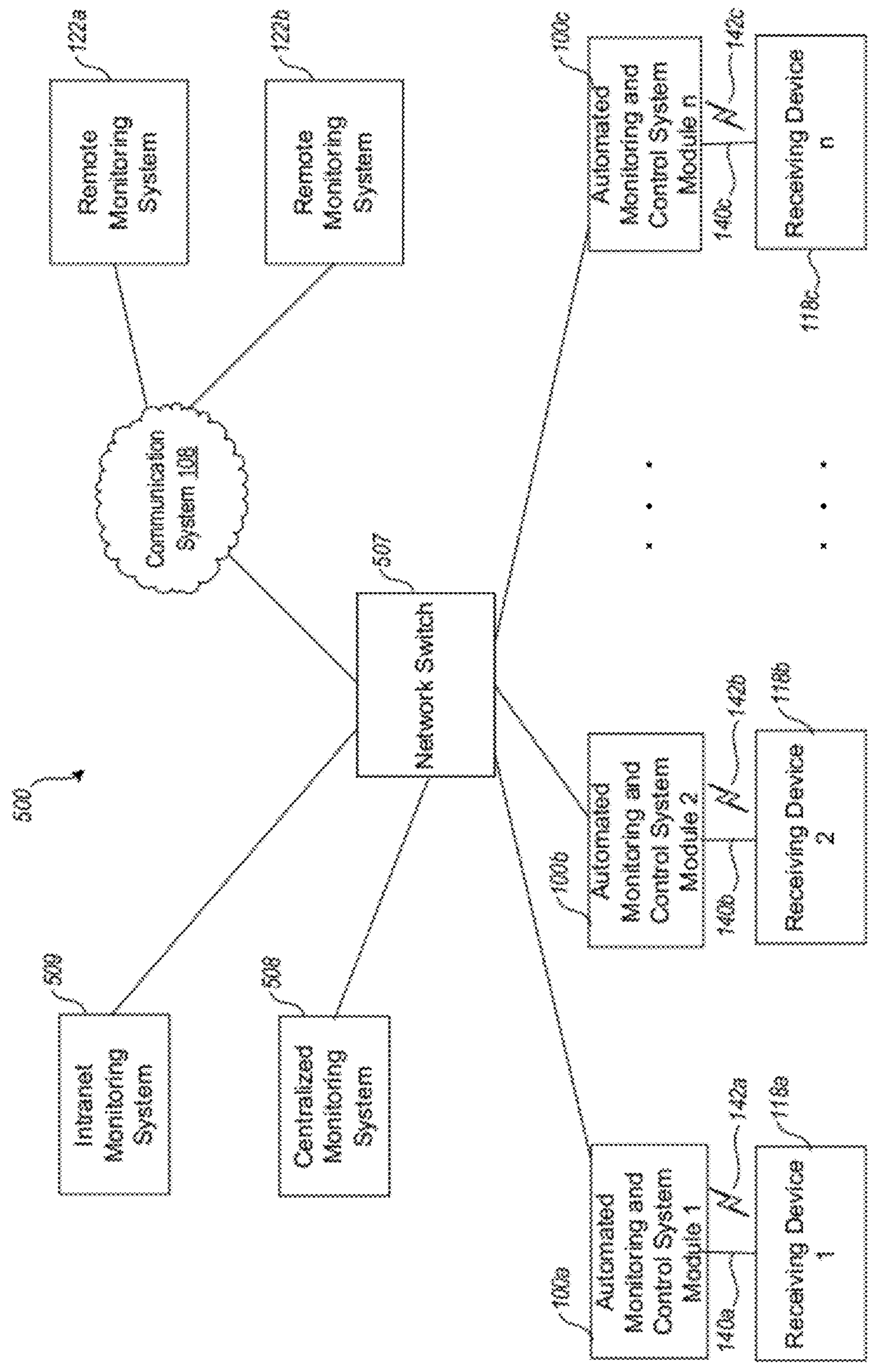
FIG. 5 a block diagram of a system for highly scalable, automated and simultaneous testing and monitoring of multiple receiving devices according to one example embodiment.

E. Example System for Simultaneous Testing and Monitoring of Multiple Receiving devices FIG. 5 is a block diagram of a system 500 for highly scalable, automated and simultaneous testing and monitoring of multiple receiving devices, according to one example embodiment. Shown in FIG. 5 are a plurality of automated monitoring and control system module devices (automated monitoring and control system module 1 100*a*, automated monitoring and control system module 2 100*b*, . . . , automated monitoring and control system module n 100*c*), each connected to a respective receiving device 118 (receiving device 1 118*a*, receiving device 2 118*b*, . . . , receiving device n 118*c*). In this way, each receiving device 118 (receiving device 1 118*a*, receiving device 2 118*b*, . . . , receiving device n 118*c*) may be tested simultaneously or nearly simultaneously with the corresponding automated monitoring and control system module device (automated monitoring and control system module 1 100*a*, automated monitoring and control system module 2 100*b*, . . . , automated monitoring and control system module n 100*c*). Each receiving device 118 need not be a same model or have the same tests run or monitoring scenario run at the same time because each automated monitoring and control system module operates independently using particular configurations and parameters according to the individual corresponding receiving device to which it is connected.

Each automated monitoring and control system module (automated monitoring and control system module 1 100*a*, automated monitoring and control system module 2 100*b*, . . . , automated monitoring and control system module n 100*c*) is operably connected to the network switch 507 (e.g., via the corresponding network interface of each automated monitoring and control system module). A centralized monitoring system 508 (e.g., including a network-enabled computing system) is also connected to the network switch 507. The centralized monitoring system 508 receives raw test result data from each automated monitoring and control system module (automated monitoring and control system module 1 100*a*, automated monitoring and control system module 2 100*b*, . . . , automated monitoring and control system module n 100*c*) and provides further analysis of the received test result data. The centralized monitoring system 508 may also communicate with each individual automated monitoring and control system module (automated monitoring and control system module 1 100*a*, automated monitoring and control system module 2 100*b*, . . . , automated monitoring and control system module n 100*c*) via the network switch 507 to provide test instructions, monitoring instructions or other data, programs, scripts or parameters to the respective automated monitoring and control system module based on the particular diagnostic, monitoring or test data received from the respective automated monitoring and control system module and its connected receiving device 118.

For example, if a particular receiving device (e.g., receiving device 2 118*b*) fails, the automated monitoring and control system module 2 100*b* will detect the failure, fail condition, capture relevant video, audio, IR and RF, and other relevant data and communicate this to the centralized monitoring system 508 along with data identifying or otherwise regarding the particular receiving device 2 118*b*. The centralized monitoring system 508 may analyze and interpret this data in response to receiving the data communicated from the automated monitoring and control system module 2 100*b* or other request from the automated monitoring and control system module 2 100*b*. The centralized monitoring system 508 may then send customized testing and monitoring data to the automated monitoring and control system module 100*b* to further test and/or monitor the receiving device 2 118*b* in a particular manner to catch the failure again, send particular commands to the receiving device 2 118*b*, and/or create testing environment conditions for receiving the device 2 118*b* to reproduce the failure, or to perform other specified tests. The centralized monitoring system 508 may also compile all the raw testing and monitoring data of the receiving devices (receiving device 1 118*a*, receiving device 2 118*b*, . . . , receiving device n 118*c*) for further collective analysis, processing and reporting.

An Intranet monitoring system 509 may also be connected to the network switch 507. The Intranet monitoring system 508 may also receive raw test result data from each automated monitoring and control system module (automated monitoring and control system module 1 100*a*, automated monitoring and control system module 2 100*b*, . . . , automated monitoring and control system module n 100*c*) and provide further analysis of the received test result data and may be located in a different location or building on the testing premises or facility (e.g., on a local area network or wide area network).

One or more remote monitoring systems (e.g., remote monitoring system 122*a* and remote monitoring system 122*b*) may also be in operable communication with each automated monitoring and control system module (automated monitoring and control system module 1 100*a*, automated monitoring and control system module 2 100*b*, . . . , automated monitoring and control system module n 100*c*) over a communication system 108 (e.g., the Internet) to which the network switch 507 is connected. In this manner, some or all of the testing and monitoring functionality can be controlled at locations remote from the location of the particular receiving device being tested. For example, as shown in FIG. 1, the receiving device 118 may be located at a customer premises or test facilities 116 while the monitoring system may be located at the receiving device 118 manufacturing or other servicing facility, which may save a service technician or other testing engineer from having to visit the customer premises or test facilities 116. Also, the remote monitoring system 122*a* or remote monitoring system 122*b* may be located at a content provider, program distributor or other service provider office or premises (e.g., cable or satellite television service provider) so that particular programming may be provided and other signals sent directly to the receiving device 118 over the satellite, cable or other network system in response to test and monitoring data received from the automated monitoring and control system module device at the customer premises or other testing facility connected to the receiving device 118.

Some or all of the functionality of the centralized monitoring system 508 may be present in the one or more remote monitoring systems 122*a*, 122*b*. Also, pre-programmed scripts may be downloaded to any particular automated monitoring and control system module that would exercise the connected respective receiving device 118 via the network switch 507 from the centralized monitoring system 508, intranet monitoring system 509, or one or more remote monitoring systems 122*a*, 122*b* over the communication system 108, as explained in further detail below.

F. Example Monitoring and Control System Processes

Figure 6:
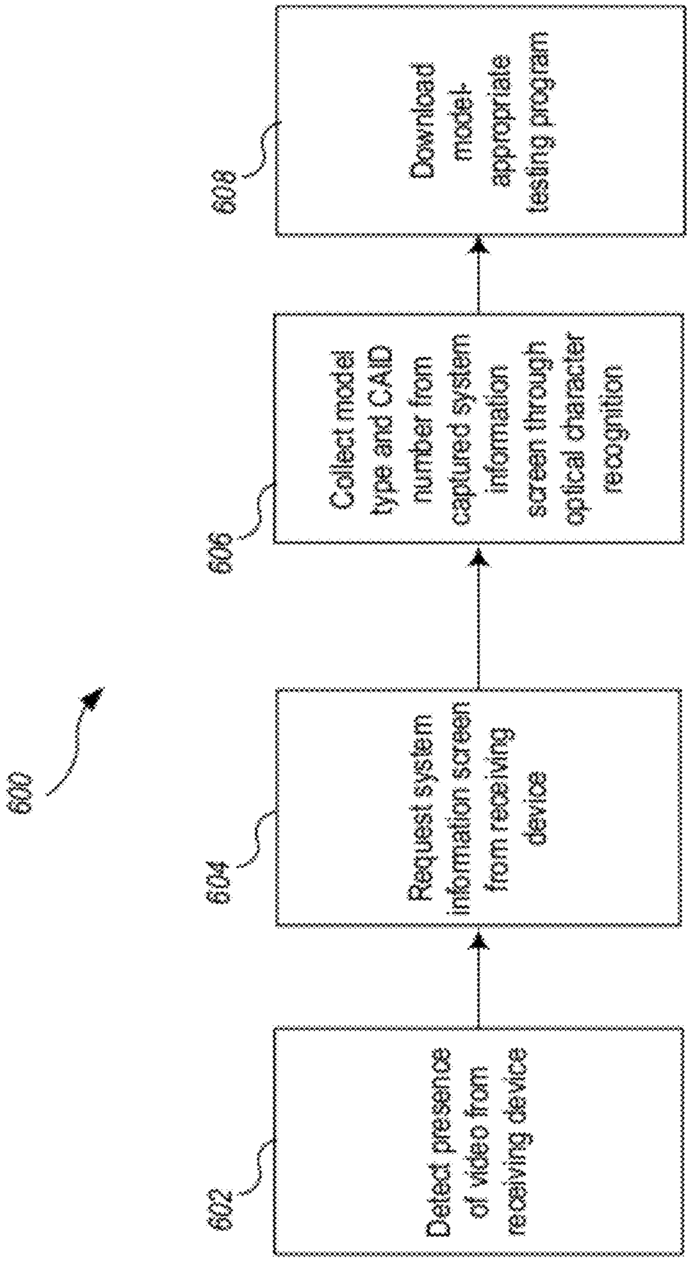
FIG. 6 is a flow diagram of an example set up process for highly scalable automated testing and monitoring of receiving devices according to one example embodiment.

FIG. 6 is a flow diagram of an example set up process for highly scalable automated testing and monitoring of receiving devices according to one example embodiment.

At 602, the automated monitoring and control system module 100 detects the presence of video from the connected receiving device 118. For example, the presence of video may be detected at any of the video inputs to the automated monitoring and control system module 100 connected to a corresponding video output of the receiving device 118.

At 604, the automated monitoring and control system module 100 or a monitoring system connected to the automated monitoring and control system module 100 requests the system information screen from the receiving device 118. The automated monitoring and control system module 100 may capture the system information screen from the receiving device 118 by sending the appropriate commands to the receiving device 118 via its IR or RF remote control transmitter to the receiving device 118 to display its system information screen.

At 606, once the automated monitoring and control system module 100 has stored the system information screen data from the receiving device 118, relevant receiving device 118 information (e.g., the model type, integrated receiver decoder (IRD) number, conditional access identification (CAID) number, or other identification number or code is automatically collected from the stored system information screen through automated optical character recognition. This collection of the relevant receiving device 118 information from the stored system information screen data may be performed by the automated monitoring and control system module 100 itself, or the stored screen data may be sent to a monitoring system connected to the automated monitoring and control system module 100 over a network or other communication system 108, which will then perform the collection of the relevant receiving device 118 information from the stored system information screen data.

This determination of the relevant receiving device 118 system information provides the ability to provide customized tests, test programs and test scripts from a remote central server or monitoring system. For example, if newly updated test programs become available for a particular model of a receiving device, these new test programs may be stored on one central server and then downloaded to individual automated monitoring and control system modules that are coupled to the particular receiving device as needed or on demand.

In particular, if a particular receiving device fails, the automated monitoring and control system module 100 will detect the failure, fail condition, store relevant video, audio, IR and RF, and other relevant data and communicate this to the centralized monitoring system 508 along with data identifying or otherwise regarding the particular receiving device 2 188*b*. The centralized monitoring system 508 may analyze and interpret this data in response to receiving the data communicated from the automated monitoring and control system module 100 or other request from the automated monitoring and control system module 100.

In response to and/or based on based on interpreted test result data, the centralized monitoring system 508 or a technician may then build new, updated or otherwise customized test programs for that specific model of receiving device 118 and possibly other specific models of receiving devices. The centralized monitoring system 508 may then send customized testing and monitoring data to various automated monitoring and control system modules depending on the receiving device 118 model or other receiving device 118 information received the particular automated monitoring and control system module. The customized test programs may further test and/or monitor the applicable receiving device 118 in a particular manner to catch the failure again, detect other particular failures, send particular commands to the receiving device 118, and/or create testing environment conditions for receiving the device 118 to reproduce the failure, or to perform other specified tests.

At 608, the automated monitoring and control system module 100 thus downloads the appropriate testing instructions, program, script or other testing information appropriate to the particular model of the receiving device 118 or according to other configuration information of the receiving device 118. For example, this testing information may be downloaded from the centralized monitoring system 508, intranet monitoring system 509, or one or more other remote monitoring systems (e.g., remote monitoring systems 122*a* or 122*b*) over the communication system 108.

Alternatively, the automated monitoring and control system module 100 may have a number of testing programs scripts or other testing information stored locally on the automated monitoring and control system module 100 appropriate for the particular connected receiving device 118 and the automated monitoring and control system module 100 may select the applicable testing scripts or other testing information based on the particular model of the receiving device 118 or according to other configuration information of the receiving device 118 collected, stored or otherwise read from the system information screen of the connected receiving device 118. If the testing programs scripts or other testing information stored locally on the automated monitoring and control system module 100 is outdated, insufficient, or is not found, the automated monitoring and control system module 100 may then proceed to download the updated or otherwise applicable testing programs from the centralized monitoring system 508.

Additionally, other methods for acquiring the appropriate testing scripts or other testing information may be used in addition to or instead of storing the system information screen data may include reading information stored within the memory of the receiving device 118 communicated to the automated monitoring and control system module 100 via various other connections between the automated monitoring and control system module 100 and the connected receiving device 118 including, but not limited to USB connections, network connections (e.g., Ethernet), short-range wireless connections, other serial connections, etc.

Figure 7:
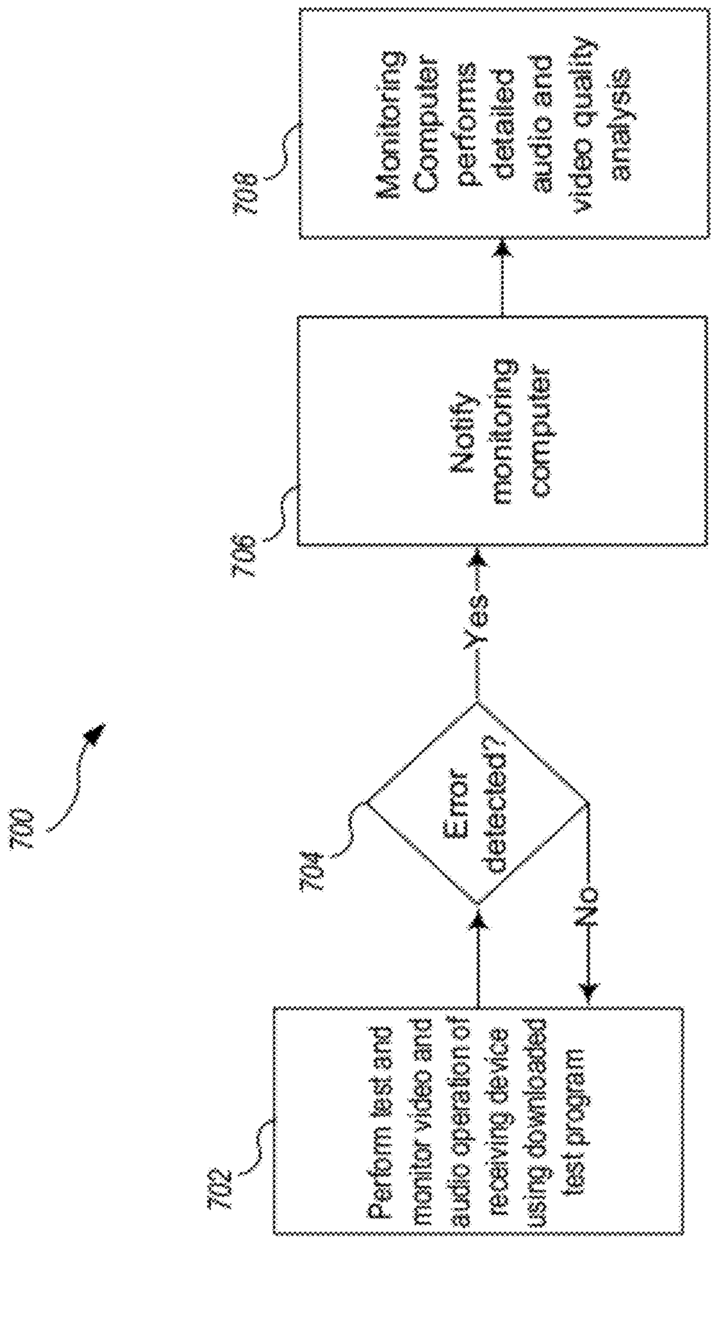
FIG. 7 is a flow diagram of an example process following the set up process of FIG. 6 for highly scalable automated testing and monitoring of receiving devices according to one example embodiment.

FIG. 7 is a flow diagram of an example process following the set up process of FIG. 6 for highly scalable automated testing and monitoring of receiving devices according to one example embodiment.

At 702, the automated monitoring and control system module 100 performs tests and monitors video and audio operation of the connected receiving device 118 using the downloaded customized testing program, script or other testing information. For example the downloaded program may be run using the microcontroller 425 of the automated monitoring and control system module 100 as described above.

To execute each respective customized testing program, the automated monitoring and control system module 100 controls operation of the receiving device 118 to which it is connected via wireless remote control commands sent from the automated monitoring and control system module 100 to the receiving device 118 via a wireless remote control signal. This testing program may be performed to simulate various commands that an end user of the receiving device 118 would send using the receiver's remote control device. In particular, the automated monitoring and control system module 100 may control the receiving device 118 via an IR wireless signal 323 output from IR blast diode 322 in the same manner or a manner similar to a corresponding remote control device 128 (shown in FIG. 1) of the receiving device 118. In this way, the automated monitoring and control system module 100 may send commands or a set of commands to control operation of the receiving device 118 to simulate any of various commands that may otherwise be sent manually using the remote control device 128. For example, such commands as changing channels, changing the volume, recording, playing, pausing, fast forwarding and rewinding of programs, selecting menu items, configuring the receiving device 118, and any other command that could be sent from the remote control device of the receiving device 118 may be sent by the automated monitoring and control system module 100 during the test execution. The automated monitoring and control system module 100 may also control the temperature of a testing environment of the receiving device 118 and vary AC voltages to the receiving device 118.

At 704, the automated monitoring and control system module 100 determines whether an error has been detected. For example, the microcontroller 425 of the automated monitoring and control system module 100 may monitor the various video audio and inputs from the receiving device 118 to the automated monitoring and control system module 100, switching to each different input as needed in a predefined pattern, switching matrix, or in a round-robin fashion. The microcontroller 425 may save particular images, image sequences, or audio to memory of the microcontroller 425, to determine whether various error conditions are present. Such error conditions may include data indicating loss of power, hardware malfunction, a stuck or frozen screen, command failure, lost signal, distorted signal, noise, etc. The microcontroller 425 may also detect and store the testing environment conditions (e.g., temperature) during failure conditions and also duplicate such conditions to reproduce the failure on the same receiving device 118 or other devices under test. If an error has been detected the process continues to 706 and if an error is not detected the process continues to 702.

At 706, the automated monitoring and control system module 100 automatically notifies a monitoring computer of the error and may provide additional relevant information to the monitoring computer regarding the error or the receiving device 118, including, but not limited to captured or stored video data, audio data, and IR or RF data from the receiving device 118. The monitoring computer may be that of the centralized monitoring system 508, intranet monitoring system 509, or one or more other remote monitoring systems (e.g., remote monitoring systems 122*a* or 122*b*). The detected error and additional relevant information may be communicated over the communication system 108 (shown in FIG. 1 through FIG. 3) via the Ethernet transceiver 433 of the automated monitoring and control system module 100.

At 708, the monitoring computer performs further processing and analysis based on the notification received and any relevant information sent to the monitoring computer regarding the error or the receiving device 118. This relevant information may include, but is not limited to captured or stored video data, audio data, and IR or RF data from the receiving device 118. For example, this further processing and analysis may be detailed audio and video quality analysis of the received captured video, audio and IR or RF data, testing environment analysis, and/or collective analysis including data received from other automated monitoring and control system modules regarding other respective receiving devices connected to the other automated monitoring and control system modules.

In one embodiment, the monitoring computer or a technician may build new, updated or otherwise customized test programs based on the notification received and the relevant information sent to the monitoring computer regarding the error or the receiving device 118. The monitoring computer may then send customized testing and monitoring data to various automated monitoring and control system modules depending on the receiving device 118 model or other receiving device 118 information received the particular automated monitoring and control system module. The customized test programs may further test and/or monitor the applicable receiving device 118 in a particular manner to catch the failure again, detect other particular failures, send particular commands to the receiving device 118, and/or create testing environment conditions for receiving the device 118 to reproduce the failure, or to perform other specified tests. In this way, the same automated monitoring and control system module may be moved from one receiving device 118 to another and still acquire the newly updated or customized test programs or scripts for the specific receiving device 118 model to which it is currently connected.

While various embodiments have been described hereinabove, it is to be appreciated that various changes in form and detail may be made without departing from the spirit and scope of the invention(s) presently or hereafter claimed.

The invention claimed is:

1. A system for testing a plurality of receiving devices comprising:

a plurality of testing devices, each testing device comprising:

at least one processor;

a memory coupled to the at least one processor;

at least one input configured to be operably connected to at least one corresponding output of a receiving device;

at least one signal processing circuit coupled to the at least one processor, the at least one signal processing circuit configured to process audio or video signals received from the receiving device at the at least one input; and at least one network communications module coupled to the at least one processor, and wherein the at least one processor is configured to:

electronically detect presence of video output from one or more output ports of the receiving device;

in response to the electronically detecting presence of video output from one or more output ports of the receiving device, send a command to the receiving device to display a system information screen, the system information screen visually indicating receiving device identification information of the receiving device;

in response to the display of the system information screen, electronically capture an image of the system information screen;

electronically collect, via optical character recognition, the receiving device identification information of the receiving device from the captured image of the system information screen;

electronically communicate the receiving device identification information of the receiving device collected from the captured image of the system information screen to a remote monitoring, system;

in response to the electronically communicating the receiving device identification information of the receiving device collected from the captured image of the system information screen to the remote monitoring system, receive a testing program for the receiving device from the remote monitoring system based on the receiving device identification information of the receiving device collected from the captured image of the system information screen;

execute the testing program for the receiving device received from the remote monitoring system based on the receiving device identification information of the receiving device collected from the captured image of the system information screen;

monitor one or more output ports of the receiving device;

store on the testing device one or more of audio signal data and video signal data from the one or more output ports of the receiving device as a result of executing the testing program;

communicate from the testing device data indicating results of the monitoring to the remote monitoring system; and communicate from the testing device to the remote monitoring system at least some of the stored audio signal data or stored video signal data;

wherein each testing device is operably connected via the respective at least one input of the testing device to a respective receiving device via the at least one corresponding output of the respective receiving device and each testing device is operably connected to a network switch via the at least one network communications module of the testing device; and wherein the remote monitoring system is operably connected to the network switch, the remote monitoring system configured to receive data indicating results of the monitoring and the at least some of the stored audio signal data and video signal data.

2. The system of claim 1 wherein the at least one processor of each testing device is further configured to execute, substantially concurrently with each other testing device, the testing program for the respective receiving device connected to each testing device.

3. The system of claim 1, wherein at least one testing device of the plurality of testing devices further includes a wireless remote control transmitter coupled to the processor of the testing device and wherein the processor of the testing device is further configured to execute the testing program by automatically sending wireless commands via the wireless remote control transmitter to a wireless remote control receiver of the respective receiving device connected to the testing device to cause the respective receiving device to perform various functions according to the testing program.

4. The system of claim 1, wherein at least one testing device of the plurality of testing devices further includes a temperature control unit coupled to the processor of the testing device and wherein the processor of the testing device is further configured to cause the temperature control unit to generate a signal to activate a heater or cooler within a testing environment of the respective receiving device connected to the testing device to cause a temperature of the testing environment of the receiving device to change according to the testing program.

5. A method for testing a receiving device comprising:

electronically detecting, by at least one processor of a testing device, presence of video output from one or more output ports of a receiving device;

in response to the electronically detecting presence of video output from one or more output ports of the receiving device, sending, by at least one processor of the testing device, a command to the receiving device to display a system information screen, the system information screen visually indicating receiving device identification information;

in response to the display of the system information screen, electronically capturing by at least one processor of the testing device, an image of the system information screen;

electronically collecting, by at least one processor of the testing device, via optical character recognition, the receiving device identification information from the captured image of the system information screen;

electronically communicating by at least one processor of the testing device, the receiving device identification information collected from the captured image of the system information screen to a remote monitoring system;

in response to the electronically communicating the receiving device identification information collected from the captured image of the system information screen to the remote monitoring system, receiving, by at least one processor of the testing device, a testing program from the remote monitoring system based on the receiving device identification information collected from the captured image of the system information screen;

executing, by at least one processor of the testing device, the received testing program for the receiving device received from the remote monitoring system based on the receiving device identification information of the receiving device collected from the captured image of the system information screen;

electronically monitoring, by at least one processor of the testing device, one or more output ports of the receiving device;

storing on the testing device, by at least one processor of the testing device, one or more of audio signal data and video signal data from the one or more output ports of the receiving device as a result of the execution of the testing program;

electronically communicating from the testing device, by at least one processor of the testing device, data indicating results of the monitoring to the remote monitoring system; and electronically communicating from the testing device, by at least one processor of the testing device, to the remote monitoring system at least some of the stored audio signal data or stored video signal data.

6. The method of claim 5 wherein the receiving device is a set-top box.

7. The method of claim 5 further comprising:

electronically receiving from the remote monitoring system one or more additional testing programs for the receiving device based on the communicating the data indicating results of the monitoring to the remote monitoring system and based on the receiving device identification information; and executing, by a processor, the received one or more additional testing programs for the receiving device.

8. The method of claim 5 wherein the executing the received testing program for the receiving device comprises automatically sending wireless commands to a wireless remote control receiver of the receiving device to cause the receiving device to perform various functions according to the received testing program.

9. The method of claim 8 wherein the executing the received testing program for the receiving device further comprises generating a signal to activate a heater or cooler within a testing environment of the receiving device to cause a temperature of the testing environment of the receiving device to change according to the received testing program.

10. A testing device for testing a receiving device, the testing device comprising:

at least one processor;

a memory coupled to the at least one processor;

at least one input configured to be operably connected to at least one corresponding output of a receiving device;

at least one signal processing circuit coupled to the at least one processor, the at least one signal processing circuit configured to process audio or video signals received from the receiving device at the at least one input; and at least one network communications module coupled to the at least one processor, and wherein the at least one processor is configured to:

electronically detect presence of video output from one or more output ports of the receiving device;

in response to the electronically detecting presence of video output from one or more output ports of the receiving device, send a command to the receiving device to display a system information screen, the system information screen visually indicating receiving device identification information of the receiving device;

in response to the display of the system information screen, electronically capture an image of the system information screen;

electronically collect, via optical character recognition, the receiving device identification information of the receiving device from the captured image of the system information screen;

electronically communicate the receiving device identification information of the receiving device collected from the captured image of the s system information screen to a remote monitoring system;

in response to the electronically communicating the receiving device identification information of the receiving device collected from the captured image of the system information screen to the remote monitoring system, receive a testing program for the receiving device from the remote monitoring s stem based on the receiving device identification information of the receiving device collected from the captured image of the system information screen;

execute a testing program for the receiving device received from the remote monitoring system based on the receiving device identification information of the receiving device collected from the captured image of the system information screen;

monitor one or more output ports of the receiving device;

store on the testing device one or more of audio signal data and video signal data from the one or more output ports of the receiving device as a result of executing the testing program;

communicate from the testing device data indicating results of the monitoring to the remote monitoring system; and communicate from the testing device to the remote monitoring system at least some of the stored audio signal data or stored video signal data.

11. The device of claim 10 wherein the at least one input is configured to be operably connected to the at least one corresponding output of the receiving device by a wireless connection.

12. The device of claim 10 wherein the at least one input is an HDMI input port is and the at least one corresponding output of the receiving device is an HDMI output port.

13. The device of claim 12 further comprising a wireless remote control transmitter coupled to the processor and wherein the processor is further configured to execute the testing program by automatically sending wireless commands via the wireless remote control transmitter to a wireless remote control receiver of the receiving device to cause the receiving device to perform various functions according to the testing program.

14. The device of claim 12 further comprising a temperature control unit coupled to the processor and wherein the processor is further configured to cause the temperature control unit to generate a signal to activate a heater or cooler within a testing environment of the receiving device to cause a temperature of the testing environment of the receiving device to change according to the testing program.

15. A non-transitory computer-readable storage medium having computer executable instructions thereon, that when executed by a computer processor, cause the following method for testing a receiving device to be performed by a testing device:

electronically detecting presence of video output from one or more output ports of a receiving device;

in response to the electronically detecting presence of video output from one or more output ports of the receiving device, sending a command to the receiving device to display a system information screen, the system information screen visually indicating receiving device identification information;

in response to the display of the system information screen, electronically capturing an image of the system information screen;

electronically collecting, via optical character recognition, the receiving device identification information from the captured image of the system information screen;

electronically communicating the receiving device identification information collected from the captured image of the system information screen to a remote monitoring system;

in response to the electronically communicating the receiving device identification information collected from the captured image of the system information screen to the remote monitoring system, receiving a testing program from the remote monitoring system based on the receiving device identification information collected from the captured image of the system information screen;

executing the testing program received from the remote monitoring system based on the receiving device identification information collected from the captured image of the system information screen by:

electronically monitoring one or more output ports of the receiving device; and storing on the testing device one or more of audio signal data and video signal data from the one or more output ports of the receiving device as a result of the execution of the testing program;

electronically communicating from the testing device over a network connection data indicating results of the monitoring to the remote monitoring system; and electronically communicating from the testing device over the network connection to the remote monitoring system at least some of the stored audio signal data or stored video signal data.

16. The non-transitory computer-readable storage medium of claim 15 wherein the electronically monitoring comprises:

switching from monitoring one of the one or more output ports to another of the one of the one or more output ports according to a predefined pattern.

17. The non-transitory computer-readable storage medium of claim 16 wherein the executing of the testing program further includes:

detecting when the video signal data from the one or more output ports of the receiving device is disrupted or distorted; and storing the disrupted or distorted video signal data to communicate the disrupted or distorted video signal data to the remote monitoring system.

18. The non-transitory computer-readable storage medium of claim 15 wherein the executable instructions, when executed by a computer processor, further cause the following to be performed:

taking a digital picture of a light emitting diode (LED) display on a panel of the receiving device;

analyzing the digital picture of the light emitting diode (LED) display to determine a current operating state or configuration of the receiving device; and using the determined current operating state or configuration of the receiving device from the light emitting diode (LED) in the performance of or analysis of testing of the receiving device.

* * * * *